(12) United States Patent
Ogasa

(10) Patent No.: US 9,413,033 B2
(45) Date of Patent: Aug. 9, 2016

(54) ALL-SOLID LITHIUM ION SECONDARY BATTERY

(71) Applicant: OHARA INC., Kanagawa (JP)

(72) Inventor: Kazuhito Ogasa, Kanagawa (JP)

(73) Assignee: OHARA INC., Kanagawa (JP)

( * ) Notice: Subject to any disclaimer, the term of this patent is extended or adjusted under 35 U.S.C. 154(b) by 63 days.

(21) Appl. No.: 14/030,358

(22) Filed: Sep. 18, 2013

(65) Prior Publication Data

US 2014/0080006 A1    Mar. 20, 2014

(30) Foreign Application Priority Data

Sep. 19, 2012  (JP) ................................. 2012-205179

(51) Int. Cl.
| | |
|---|---|
| *H01M 10/0562* | (2010.01) |
| *H01M 10/0525* | (2010.01) |
| *H01M 4/485* | (2010.01) |
| *H01M 4/58* | (2010.01) |

(52) U.S. Cl.
CPC .......... *H01M 10/0562* (2013.01); *H01M 4/485* (2013.01); *H01M 4/5825* (2013.01); *H01M 10/0525* (2013.01); *H01M 2300/0071* (2013.01); *Y02E 60/122* (2013.01); *Y02P 70/54* (2015.11)

(58) Field of Classification Search
CPC ..................... H01M 10/0525; H01M 10/0562; H01M 2300/0071; H01M 4/485; H01M 4/5825; Y02E 60/122
USPC ......... 429/304, 209, 221, 226, 231.5, 231.93, 429/252
See application file for complete search history.

(56) References Cited

U.S. PATENT DOCUMENTS

| | | | |
|---|---|---|---|
| 5,759,366 A | 6/1998 | Ottlinger | |
| 8,148,289 B2 | 4/2012 | Tokuhiro | |
| 8,518,848 B2 | 8/2013 | Tokuhiro | |
| 8,852,816 B2 | 10/2014 | Ogasa | |
| 8,906,553 B1 | 12/2014 | Badway | |
| 2007/0172739 A1* | 7/2007 | Visco | ............. H01M 12/04 429/322 |
| 2009/0087723 A1* | 4/2009 | Inda | ............. H01M 10/425 429/62 |
| 2009/0123813 A1* | 5/2009 | Chiang | ............. C01B 25/45 429/50 |
| 2010/0308278 A1* | 12/2010 | Kepler | ............. H01M 4/139 252/506 |
| 2011/0104553 A1* | 5/2011 | Pol | ............. B82Y 30/00 429/156 |
| 2012/0237834 A1* | 9/2012 | Ogasa | ............. H01M 10/0562 429/320 |

FOREIGN PATENT DOCUMENTS

| | | |
|---|---|---|
| JP | 2004039359 | 2/2004 |
| JP | 2009-140910 | 6/2009 |
| WO | 2012063874 | 5/2012 |

OTHER PUBLICATIONS

"Battery Handbook," The Electrochemical Society of Japan, The Committee of Battery Technology, First Edition, Ohm-Sha Publishers, Feb. 10, 2010, p. 162.
Hui Xie, Yutao Li and John B. Goodenough, "NASICON-type Li1+2xZr2-xCax(PO4)3," RSC Advances, 1(2011) pp. 1728-1731.
C. R. Mariappan, G. Govindaraj, S. Vinoth Ratan, G. Vijaya Prakash, "Vitrification of K3M2P3O12 (M=B, Al, Bi) NASICON-type materials and electrical relaxation studies," Materials Science and Engineering B 123 (2005) pp. 63-68.
Ignaszak, P. Pasierb, S. Komornicki, "The effect of humidityon the electrical properties of Nasicon-type materials," Materials Science—Poland, vol. 24, No. 1 (2006) pp. 95-102.
F. Labat, P. Baranek, C. Domain, C. Minot, C. Adamo, "Density functional theory analysis of the structural and electronic properties of TiO2 and anatase polytypes: Performances of different exchange-correlation functionals," The Journal of Chemical Physics, 126 (2007) pp. 154703-1-154703-12.
Japanese Office Action dated Apr. 5, 2016 issued in the corresponding Japanese patent application No. 2012-205179.

* cited by examiner

*Primary Examiner* — Patrick Ryan
*Assistant Examiner* — Ben Lewis
(74) *Attorney, Agent, or Firm* — Rankin, Hill & Clark LLP

(57) ABSTRACT

To provide an all-solid lithium ion secondary battery having a high voltage, a small internal resistance, and a discharge capacity close to a theoretical capacity and being able to be produced at low cost, and therefore, even in the case of collective sintering, generation of an inactive material due to interface reaction at the interface between an electrode active material and a solid electrolyte is reduced. An all-solid lithium ion secondary battery including a positive electrode layer, a negative electrode layer, and a solid electrolyte layer disposed between the positive electrode layer and the negative electrode layer, wherein an electrode active material included in the positive electrode layer is a phosphate having an olivine structure; and a solid electrolyte crystal included in the solid electrolyte layer includes polyphosphoric acid and the content of $Li_2O$ is 16 mol % to 25 mol % in terms of mol % on an oxide basis.

23 Claims, 2 Drawing Sheets

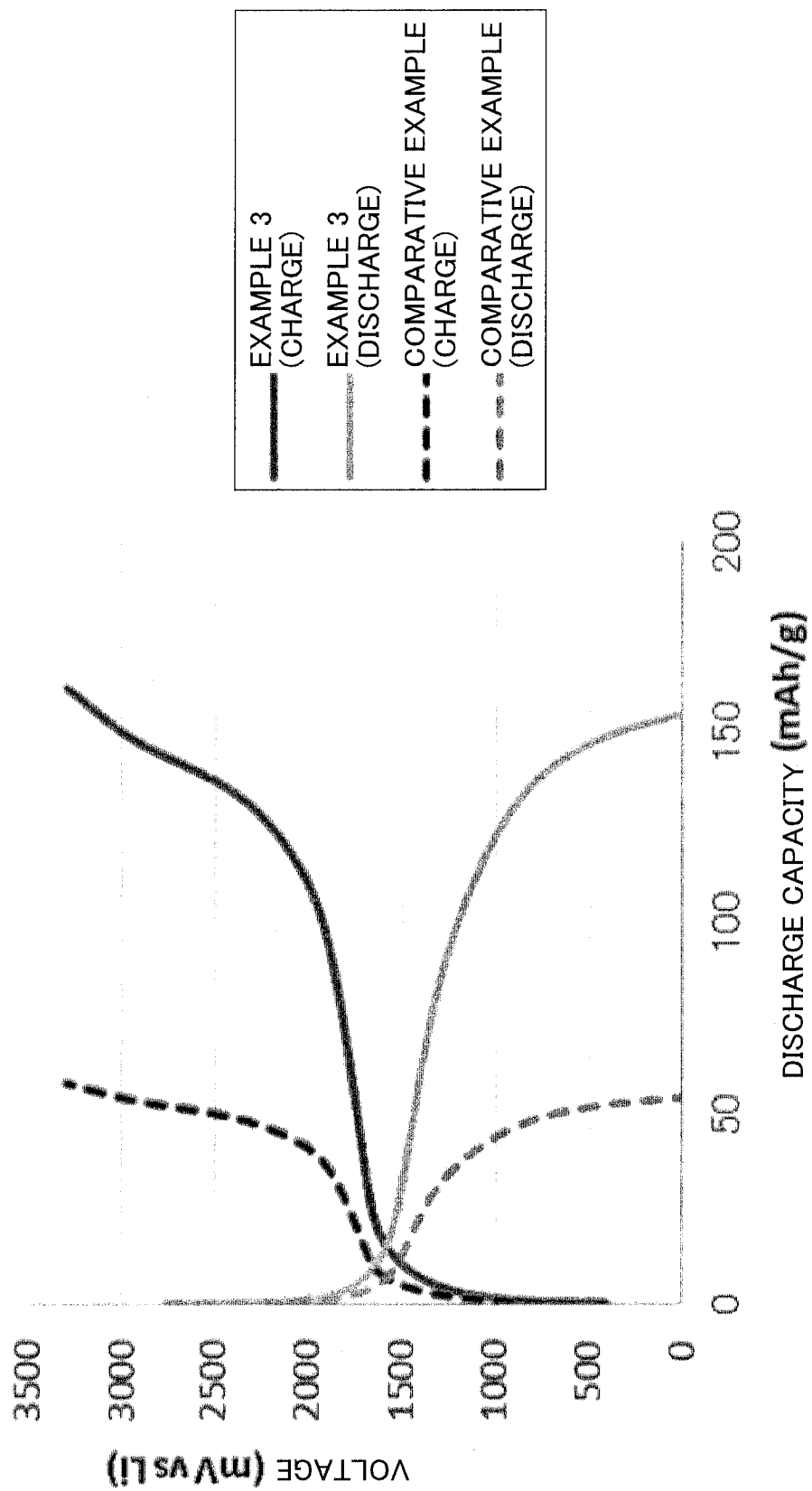

ALL-SOLID LITHIUM ION SECONDARY BATTERY

This application is based on and claims the benefit of priority from Japanese Patent Application No. 2012-205179, filed on 19 Sep. 2012, the content of which is incorporated herein by reference.

BACKGROUND OF THE INVENTION

1. Field of the Invention

The present invention relates to an all-solid lithium ion secondary battery including no organic substance.

2. Related Art

An all-solid lithium ion secondary battery in which a solid electrolyte layer and an electrode layer are configured using an inorganic solid and not using an organic substance has been expected as a safe battery. The reason is that this battery is free from any problems concerning leakage of an organic electrolytic solution and generation of gas from the organic electrolytic solution. Further, the all-solid lithium ion secondary battery is less likely to produce a side reaction other than battery reactions as compared to liquid batteries, and therefore can be expected to have a long operating life as compared to the liquid batteries. Especially, an all-solid lithium ion secondary battery that does not use a sulfide having a possibility of generating poisonous gas exhibits high safety.

One example of the all-solid lithium ion secondary battery includes one in which a positive electrode layer and a negative electrode layer are laminated and sintered respectively on both sides of a solid electrolyte layer. In the all-solid lithium ion secondary battery, it is possible that constituent particles present between respective layers and in each thereof are physically bonded together by sintering. However, during sintering, at a sintering interface between an electrode active material and a solid electrolyte, an inactive material that is neither the electrode active material nor the solid electrolyte is generated, resulting thereby in a problem that ion conductivity resistance increases and a problem that the amount of the electrode active material contributing to charge-discharge decreases.

In the production of an all-solid lithium ion secondary battery, for reduced production cost, it has been expected to co-sinter a positive electrode layer, a solid electrolyte layer and a negative electrode layer to bond these layers together. When the positive electrode layer, the solid electrolyte layer and the negative electrode layer are co-sintered, it is specifically difficult to solve the aforementioned problems. The reason is that it is necessary to inhibit, under one kind of sintering condition, generation of an inactive material due to interface reaction at two types of interfaces that are a positive electrode active material-solid electrolyte interface and a negative electrode active material-solid electrolyte interface. For example, even when a sintering condition for inhibiting generation of an inactive material is applied in the negative electrode active material-solid electrolyte interface, this sintering condition is frequently unsuitable for sintering the positive electrode active material-solid electrolyte interface.

In Patent Document 1, an electrode active material and a solid electrolyte common in a polyanion are combined and also the same material is used as electrode active materials of a positive electrode and a negative electrode, whereby the aforementioned problems are solved and then the interface resistance of the solid electrolyte and the electrode active material after sintering is reduced.

[Patent Document 1] Japanese Unexamined Patent Application, Publication No. 2009-140910

SUMMARY OF THE INVENTION

As described in Patent Document 1, when the same material is used as electrode active materials of the positive electrode and the negative electrode, generation of an inactive material due to interface reaction is easily inhibited, but a new problem that a battery having a high voltage is not realized arises.

In view of the aforementioned problems, the present invention has been achieved, and an object of the present invention is to provide an all-solid lithium ion secondary battery having a high voltage, a small internal resistance, and a discharge capacity close to a theoretical capacity and being able to be produced at low cost.

Therefore, even in the case of collective sintering, it is necessary to reduce generation of an inactive material due to interface reaction at the interface between an electrode active material and a solid electrolyte.

The present inventors have obtained a finding that especially at a positive electrode active material-solid electrolyte interface, an inactive material due to interface reaction is markedly generated, and based on this finding, a positive electrode active material and a solid electrolyte were selected from types in a specific range and the lithium ion content of a crystal of the solid electrolyte was specified, whereby the aforementioned problems have been found to be solved and the present invention has been thus completed. Specifically, the present invention includes the following constitutions.

(Constitution 1)

An all-solid lithium ion secondary battery including a positive electrode layer, a negative electrode layer, and a solid electrolyte layer disposed between the positive electrode layer and the negative electrode layer, wherein an electrode active material included in the positive electrode layer is a phosphate having an olivine structure; and a solid electrolyte crystal included in the solid electrolyte layer includes polyphosphoric acid and the content of $Li_2O$ is 16 mol % to 25 mol % in terms of mol % on an oxide basis.

(Constitution 2)

The all-solid lithium ion secondary battery according to constitution 1, wherein the solid electrolyte crystal is NASICON type $Li_{1+x}M_yR_{2-y}Si_zP_{3-z}O_{12+a}$, where M is at least one selected from Al, La, Sr, Mg, Y, Ba, Zn, Sc, and Ca, R is at least one selected from Ge, Ti, and Zr, x is 0.1 to 1.2, y is 0.1 to 1.1, z is 0.1 to 1.0, and a is −1.0 to 1.0.

(Constitution 3)

The all-solid lithium ion secondary battery according to constitution 1, wherein the solid electrolyte crystal is NASICO-type $Li_{1+x}M_yZr_{2-y}Si_zP_{3-z}O_{12+a}$, where M is at least one selected from Al, La, Sr, Mg, Y, Ba, Zn, Sc, and Ca, x is 0.1 to 1.2, y is 0.1 to 1.1, z is 0.1 to 1.0, and a is −1.0 to 1.0.

(Constitution 4)

The all-solid lithium ion secondary battery according to constitution 1, wherein the solid electrolyte crystal is NASICON-type $Li_{1+x}M_yR_{2-y}Si_zP_{3-z}O_{12+a}$, where M is at least one selected from Mg, Ca, and Sr, R is at least one selected from Ge, Ti, and Zr, x is 0.1 to 1.2, y is 0.1 to 0.55, z is 0.1 to 1.0, and a is −1.0 to 1.0.

(Constitution 5)

The all-solid lithium ion secondary battery according to constitution 1, wherein the solid electrolyte crystal is NASICON-type $Li_{1+x}M_yZr_{2-y}Si_zP_{3-z}O_{12+a}$, where M is at least one selected from Mg, Ca, and Sr, x is 0.1 to 1.2, y is 0.1 to 0.55, z is 0.1 to 1.0, and a is −1.0 to 1.0.
(Constitution 6)

The all-solid lithium ion secondary battery according to any one of constitutions 1 to 5, wherein an electrode active material included in the positive electrode layer, an electrode active material included in the negative electrode layer, and a solid electrolyte crystal included in the solid electrolyte layer have crystal structures differing from each other.
(Constitution 7)

The all-solid lithium ion secondary battery according to any one of constitutions 1 to 6, wherein an electrode active material included in the positive electrode layer is $Li_nM'PO_4$,
where M' is at least one selected from Fe, Co, Mn, Ni, Al, Mg, Ca, Ti, and Zr and n is 0.7 to 1.5.
(Constitution 8)

The all-solid lithium ion secondary battery according to any one of constitutions 1 to 7, wherein an electrode active material included in the negative electrode layer is $Li_4Ti_5O_{12}$, anatase-type $TiO_2$, or NASICON-type $Li_{1+x}T_{2-x}(PO_4)_3$.
(Constitution 9)

The all-solid lithium ion secondary battery according to any one of constitutions 1 to 8, wherein at least one of the positive electrode layer, the negative electrode layer, and the solid electrolyte layer includes 2 to 15% by weight of a lithium ion conductive glass.
(Constitution 10)

The all-solid lithium ion secondary battery according to constitution 9, wherein the lithium ion conductive glass is $Li_2O$—$Al_2O_3$—$P_2O_5$ type glass.
(Constitution 11)

The all-solid lithium ion secondary battery according to any one of constitutions 1 to 10, wherein at least one of the positive electrode layer and the negative electrode layer includes acetylene black.

According to the present invention, even in the case of collective sintering, it is possible to obtain an all-solid lithium ion secondary battery in which generation of an inactive material due to interface reaction at the interface between the electrode active material and the solid electrolyte is reduced. As a result, the obtained all-solid lithium ion secondary battery has a high voltage, a small internal resistance, and a discharge capacity close to a theoretical capacity. The all-solid lithium ion secondary battery of the present invention is able to be produced at low cost.

BRIEF DESCRIPTION OF THE DRAWINGS

FIG. 2 is a graph illustrating charge/discharge capacities of all-solid lithium ion secondary batteries of an example and a comparative example of the present invention.

DETAILED DESCRIPTION OF THE INVENTION

Figure 1:
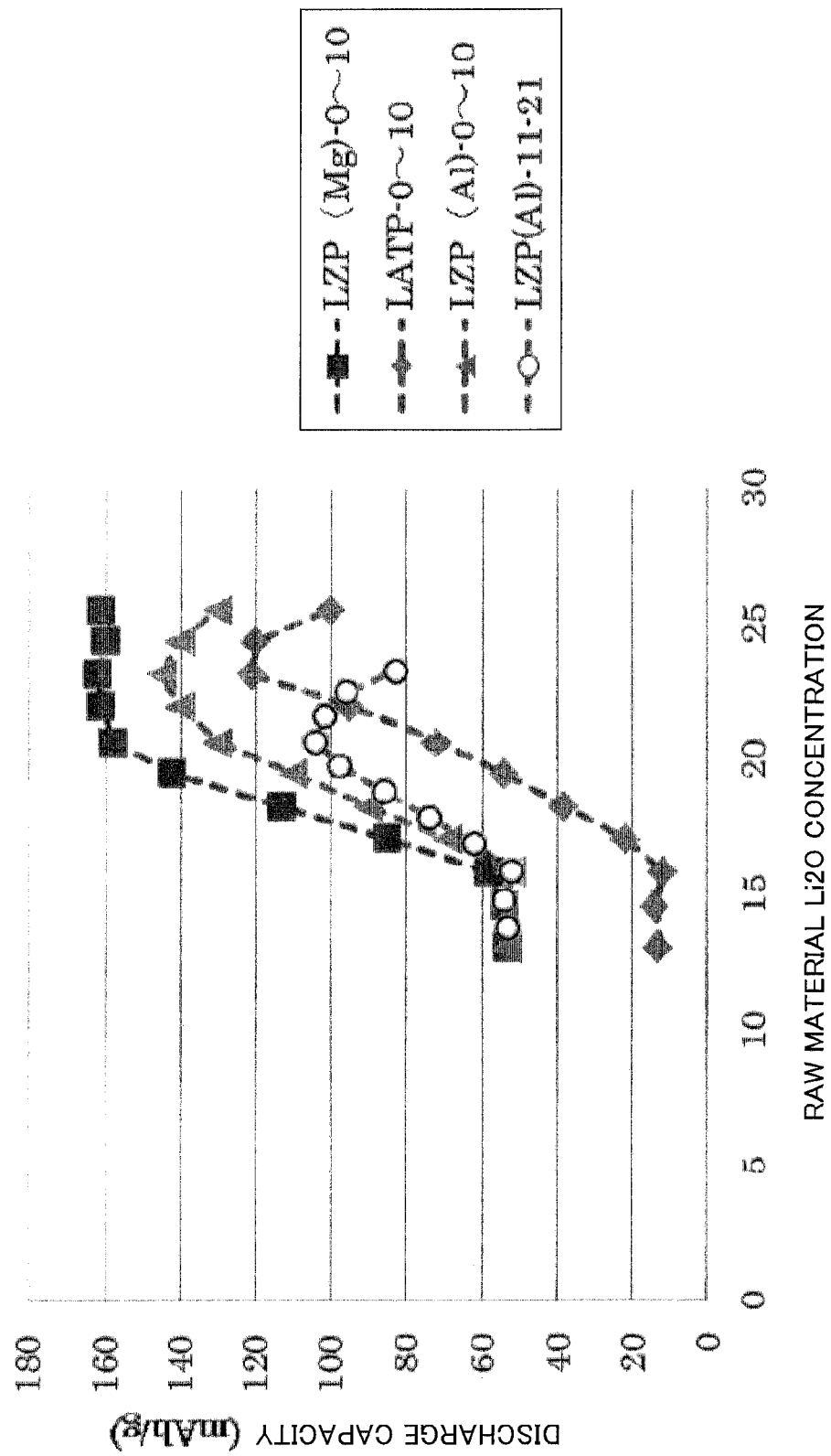
FIG. 1 is a graph illustrating a relationship between $Li_2O$ concentration (content of $Li_2O$) (mol %) in a solid electrolyte crystal and discharge capacity.

The all-solid lithium ion secondary battery of the present invention includes a positive electrode layer, a negative electrode layer, and a solid electrolyte layer disposed between the positive electrode layer and the negative electrode layer, in which an electrode active material included in the positive electrode layer is a phosphate having an olivine structure; and a solid electrolyte crystal included in the solid electrolyte layer includes polyphosphoric acid and the content of $Li_2O$ is 16 mol % to 25 mol % in terms of mol % on an oxide basis.

The electrode active material included in the positive electrode layer is a positive electrode active material. Since being characterized by releasing no oxygen during decomposition, a positive electrode active material including a phosphate having an olivine structure has an advantage of having a low risk of firing or the like. However, this positive electrode active material is likely to generate an inactive material due to interface reaction with a solid electrolyte during sintering.

In the present invention, as the solid electrolyte crystal included in the solid electrolyte layer, a solid electrolyte crystal including polyphosphoric acid is employed and with respect to the crystal, the content of $Li_2O$ is set to be 16 mol % to 25 mol % in terms of mol % on an oxide basis, and thereby, it becomes possible to inhibit generation of an inactive material at the positive electrode active material-solid electrolyte interface. For more detail, in more various sintering conditions, an inactive material is unlikely to be generated at the positive electrode active material-solid electrolyte interface. Therefore, it is possible to easily select a sintering condition such that an inactive material is unlikely to be generated at the positive electrode active material-solid electrolyte interface and the negative electrode active material-solid electrolyte interface. A lithium ion secondary battery produced using such a sintering condition has a small internal resistance, a discharge capacity close to a theoretical capacity, and a high voltage.

An embodiment of the all-solid lithium ion secondary battery of the present invention and a method for producing the same will now be described in detail. Herein, description of portions where description overlaps may be appropriately omitted but this omission does not limit the purport of the invention.

The content of each component included in a solid electrolyte and a solid electrolyte crystal constituting the all-solid lithium ion secondary battery of the present invention is sometimes represented on an oxide basis. Herein, the "oxide basis" refers to a method in which elements, other than oxygen, constituting a material are assumed to exist as oxides and the contents of the elements constituting the material are represented on a basis of the oxides.
[All-Solid Lithium Ion Secondary Battery]

The all-solid lithium ion secondary battery of the present invention includes a positive electrode layer, a negative electrode layer, and a solid electrolyte layer. The solid electrolyte layer is disposed between the positive electrode layer and the negative electrode layer. It is possible to laminate a plurality of laminated cells each including the positive electrode layer, the solid electrolyte layer, and the negative electrode layer by further connecting these laminated cells in series or in parallel. In this case, it is possible that an insulating layer and a solid electrolyte layer are disposed between the laminated cells as necessary.

It is possible that a current collector is disposed on one surface of the positive electrode layer and the negative electrode layer each.

In the all-solid lithium ion secondary battery of the present invention, portions constituting an original battery function except a package and others do not substantially include an organic substance but an inorganic solid.
[Solid Electrolyte Layer]

The solid electrolyte layer of the present invention includes a solid electrolyte crystal. The solid electrolyte layer includes a solid electrolyte crystal alone in some cases, but possibly includes a lithium ion conductive glass in addition thereto. Further, in addition to the solid electrolyte crystal, in some cases, a small amount of an impurity is included.

(Solid Electrolyte Crystal)

The solid electrolyte crystal of the present invention refers to a single crystal or polycrystal of a lithium ion conductive crystal, and its crystal structure contains polyphosphoric acid. A solid electrolyte whose crystal structure contains polyphosphoric acid is able to exhibit high chemical stability and high lithium ion conductivity. As described above, when the content of $Li_2O$ in the solid electrolyte crystal is set to be 16 mol % to 25 mol % in terms of mol % on an oxide basis, it becomes possible to inhibit interface reaction with an electrode active material during sintering. To obtain this effect, the lower limit of the content of $Li_2O$ is preferably 18 mol % and most preferably 20 mol %. In the same manner, the upper limit of the content of $Li_2O$ is preferably 24 mol % and most preferably 23 mol %.

The solid electrolyte crystal preferably includes no sulfur in view of chemical stability and safety, and a solid electrolyte crystal of a perovskite type, a garnet type, a NASICON type, a LISICON type, and the like is usable. Specifically preferable is a crystal of NASICON-type $Li_{1+x}M_yR_{2-y}Si_zP_{3-z}O_{12}$ (M is at least one selected from Al, La, Sr, Mg, Y, Ba, Zn, Sc, and Ca, and R is at least one selected from Ge, Ti, and Zr; and $0.1 \leq x \leq 1.2$, $0.1 \leq y \leq 1.1$, $0.1 \leq z \leq 1.0$, and $-1.0 \leq a \leq 1.0$) since the content of $Li_2O$ becomes adjustable in a broad range. When M is at least one selected from Mg, Ca, and Sr, the value of y specifically preferably satisfies the expression $0.1 \leq y \leq 0.55$.

In the aforementioned expressions, the values of x, y, and z more preferably satisfy the following: $0.3 \leq x$, $x \leq 1.1$, $0.2 \leq y$, $y \leq 1.0$, $0.15 \leq z$, or $z \leq 0.3$, and most preferably satisfy the following: $0.4 \leq x$, $x \leq 0.7$, $0.3 \leq y$, $y \leq 0.6$, $0.2 \leq z$, or $z \leq 0.25$, from the viewpoint of an approximation to the content of $Li_2O$ of a positive electrode active material preferably used in the present invention, in order to inhibit decomposition of the positive electrode active material, in other words, in order to inhibit generation of an inactive material.

When M is at least one selected from Mg, Ca, and Sr, the upper limit of the value of Y is specifically preferably half the aforementioned value. The value of a becomes a value so as for the entire crystal to electrically have a value of 0 when the values of x, y, and z have been determined in the expressions. However, any value where the value of a is beyond the range of −1.0 to 1.0 is not preferable. The expression $-0.3 \leq a \leq 0.3$ is more preferable and the expression $-0.1 \leq a \leq 0.1$ is most preferable.

Further, in the aforementioned expressions, from the viewpoint of having high lithium ion conductivity, R is more preferably at least one selected from Ge, Ti, and Zr and most preferably Zr. Further, to inhibit decomposition of the positive electrode active material, even in the case of a large $Li_2O$ content, M is preferably at least one selected from Mg, Ca, and Sr and most preferably Mg from the viewpoint of maintaining a NASICON structure.

If the solid electrolyte layer has a thickness capable of electrically isolating the negative electrode layer and the positive electrode layer, this thickness is sufficient, and the thickness is preferably smaller. On the other hand, from the viewpoint of allowing the solid electrolyte layer to have a necessary mechanical strength, the thickness of the solid electrolyte layer is preferably at least 0.5 μm. Therefore, the thickness of the solid electrolyte layer is preferably 0.5 μm to 100 μm, more preferably 1 μm to 50 μm, and most preferably 1 μm to 20 μm.

[Positive Electrode Layer and Negative Electrode Layer]

The positive electrode layer and the negative electrode layer of the present invention include an electrode active material. In addition thereto, it is possible that at least one of the positive electrode layer and the negative electrode layer includes an electrically conductive aid, a lithium ion conductive solid electrolyte crystal, a lithium ion conductive glass, and others. In addition to these materials, a small amount of an impurity is included in some cases. Preferably, neither the positive electrode layer nor the negative electrode layer includes sulfur.

In the present description, the electrode active material included in the positive electrode layer is referred to also as a positive electrode active material, and the electrode active material included in the negative electrode layer is referred to also as a negative electrode active material.

The content of each of these electrode active material is preferably 1% by mass to 45% by mass based on the total content of the materials of the positive electrode layer or the negative electrode layer.

(Positive Electrode Active Material)

The present invention makes it possible to obtain a large voltage by using a phosphate having an olivine structure as the positive electrode active material, and generation of an inactive material due to interface reaction with a solid electrolyte crystal is inhibited. Especially when the solid electrolyte crystal includes polyphosphoric acid, this effect is largely obtained.

Herein, the olivine structure refers to one type of crystal structure which is an orthorhombic crystal and its space group is represented by Pnma where oxygen atoms are formed into a hexagonal closest packing structure and all oxygen atoms are covalently bonded to a phosphorus atom. When Fe, P, O, and Li are included as constituent elements, a structure represented by JCPDS card 83-2092 is meant.

Examples of the phosphate having an olivine structure includes $Li_2CoPO_4F$, $Li_{1+x}FeSi_xP_{1-x}O_4$, and the like, particularly $Li_nM'PO_4$ (M' represents at least one selected from Fe, Co, Mn, Ni, Al, Mg, Ca, Ti, and Zr; and n satisfies the expression $0.7 \leq n \leq 1.5$) is preferable. Especially, in the aforementioned expression, M' is more preferably at least one selected from Fe, Ni, Co, and Mn, since a large effect of inhibiting generation of an inactive material due to interface reaction with a solid electrolyte crystal is obtained and a high discharge capacity is able to be maintained. In the most preferable positive electrode active material, M' is Fe in the aforementioned expression.

(Negative Electrode Active Material)

As the negative electrode active material, usable is an oxide containing a NASICON-type, olivine-type or spinel-type crystal, a rutile-type oxide, or an anatase-type oxide; or an amorphous metal oxide, a metal alloy, or the like. From the viewpoint of the possibility of increasing the voltage of a battery, $Li_4Ti_5O_{12}$, anatase-type $TiO_2$, or NASICON-type $Li_{1+x}Al_xTi_{2-x}(PO_4)_3$ ($0.1 \leq x \leq 1$) is specifically preferable, since it is possible to reduce generation of an inactive material due to interface reaction with a solid electrolyte crystal and to lower a negative electrode potential.

(Electrically Conductive Aid)

As an electrically conductive aid included in the positive electrode layer or the negative electrode layer, usable are at least one selected from carbon, a metal including Ni, Fe, Mn, Co, Mo, Cr, Ag, and Cu and an alloy thereof. Further, usable are a metal such as titanium, stainless steel, aluminum, and the like and a noble metal such as platinum, silver, gold, rhodium, and the like. When such a material exhibiting high electron conductivity is used as the electrically conductive aid, the amount of current capable of being conductive through a narrow electron conductive path formed in an electrode layer increases and therefore, the charge/discharge characteristics of the all-solid lithium ion secondary battery are able to be enhanced. In particular, acetylene black is more preferably used as the electrically conductive aid, since in a wide temperature range during sintering, any inactive material is not generated through reaction with an electrode active material, a solid electrolyte crystal, and a lithium ion conductive glass.

In view of the balance between a battery capacity and the electron conductivity of an electrode layer, the content of the electrically conductive aid is preferably 1% by mass to 20% by mass, more preferably 2% by mass to 15% by mass, and most preferably 4% by mass to 10% by mass based on the total weight of the electrode layer.

The thicknesses of the negative electrode layer and the positive electrode layer are preferably at least 1 μm from the viewpoint of being provided with an ability of storing lithium ions as a secondary battery. On the other hand, when these thicknesses are excessively large, the resistance of lithium ions and electrons increases. Therefore, the thicknesses of the negative electrode layer and the positive electrode layer are preferably 1 μm to 100 μm, more preferably 1 μm to 50 μm, and most preferably 1 to 20 μm (Lithium Ion Conductive Glass)

To tightly bond an electrode active material or a solid electrolyte crystal, at least one of the positive electrode layer, the negative electrode layer, and the solid electrolyte layer of the present invention preferably includes a lithium ion conductive glass. The lithium ion conductive glass is softened and fluidized during sintering and thereby sintering and densification of powder are promoted. To obtain this effect, the content of the lithium ion conductive glass respectively is preferably at least 2% by weight, more preferably at least 3% by weight, and most preferably at least 5% by weight, based on the weight of each layer. On the other hand, when the content of the lithium ion conductive glass is excessively large, a decrease in discharge capacity occurs in the electrode layers and then a decrease in lithium ion conductivity occurs in the solid electrolyte layer. Therefore, the content of the lithium ion conductive glass respectively is preferably at most 15% by weight, more preferably at most 10% by weight, and most preferably at most 8% by weight, based on the weight of each layer. The lithium ion conductive glass refers to an amorphous one having a lithium ion conductivity of at least $1 \times 10^{-9}$ S/cm.

Herein, as the lithium ion conductive glass, $LiPO_3$ glass, $Li_2O$—$SiO_2$ type glass, and the like are usable, especially $Li_2O$—$Al_2O_3$—$P_2O_5$ type glass is preferable. The reason is that this type glass has high lithium ion conductivity, as well as low devitrification properties and softening point. In the $Li_2O$—$Al_2O_3$—$P_2O_5$ type glass, the total content of a $Li_2O$ component, an $Al_2O_3$ component, and a $P_2O_5$ component is preferably at least 90 mol % on an oxide basis.

More preferably, with respect to the composition of the lithium ion conductive glass, in terms of mol % on an oxide basis, as described in the following:

$Li_2O$: 35 mol % to 60 mol %,
$Al_2O_3$: 1 mol % to 10 mol %,
$P_2O_5$: 35 mol % to 50 mol %,
$SiO_2$: 0 mol % to 10 mol %, and
$WO_3$: 0 mol % to 10 mol %, each component listed above is included.

Further, in the lithium ion conductive glass, the content of sulfur is preferably as small as possible. Especially, no inclusion of sulfur makes it possible to prevent generation of hydrogen sulfide gas from the all-solid lithium ion secondary battery.

In the all-solid lithium ion secondary battery of the present invention, an electrode active material included in the positive electrode layer, an electrode active material included in the negative electrode layer, and a solid electrolyte crystal included in the solid electrolyte layer preferably have crystal structures differing from each other. Such different crystal structures make it possible to obtain an all-solid lithium ion secondary battery having high energy density.

The contents of a lithium ion conductive solid electrolyte crystal, a lithium ion conductive glass, an electrode active material, and an electrically conductive aid included in the all-solid lithium ion secondary battery of the present invention, and the compositions and crystal structures thereof can be identified by shaving off the solid electrolyte layer and/or the electrode layers constituting the all-solid lithium ion secondary battery and using an energy loss analyzer or an X-ray analyzer mounted on a field-emission transmission electron microscopy (FE-TEM) or an X-ray analyzer mounted on a field-emission scanning electron microscopy (FE-SEM). Use of such quantitative analysis and point analysis, and electron diffraction makes it possible to reveal, for example, the presence or absence of the solid electrolyte crystal and the electrode active material, and the composition ratios and crystal structures thereof.

Herein, $Li_2O$ is unable to be directly analyzed using the X-ray analyzer and therefore, it is possible to estimate the content of $Li_2O$ by calculating an electric charge from the other constitutional components.

[Method for Producing all-Solid Lithium Ion Secondary Battery]

A method for producing the all-solid lithium ion secondary battery of the present invention will now be described.

Initially, materials constituting a solid electrolyte layer, a positive electrode layer, and a negative electrode layer are produced and thereafter powder of constitutional materials is mixed with respect to each layer.

A precursor layer of each of the solid electrolyte layer, the positive electrode layer, and the negative electrode layer is formed from the mixed powder and sintered to sinter and bond each layer together.

As a method for forming the precursor layer, usable are a method in which a small amount of a binder is added as necessary and powder is compressed in a mold, a method in which powder is mixed with a solvent and a binder to form slurry and then the slurry is formed into a film, followed by drying, and others.

In sintering each layer, it is possible to use a method in which a positive electrode layer-a solid electrolyte layer and a negative electrode layer-a solid electrolyte layer are separately sintered to produce laminated cells and lastly, the solid electrolyte layer surfaces of the laminated cells are sintered/bonded to each other or a method in which one electrode layer and a solid electrolyte layer are sintered/bonded and then the other electrode layer is sintered/bonded, but in view of cost, collective sintering of each layer is preferable.

(Powder Producing Step)

Solid electrolyte crystal powder, lithium ion conductive glass powder, electrode active material powder, an electrically conductive aid and others, and powder of materials constituting a solid electrolyte layer, a positive electrode layer, and a negative electrode layer are preferably milled at an average particle diameter (D50) of at most 20 μm. Thereby, each layer is easily densified after sintering. Therefore, these average particle diameters (D50) are preferably at most 20 μm, more preferably at most 10 μm, and most preferably at most 5 μm. On the other hand, from the viewpoint of reducing a time needed for pulverization, the lower limits of these average particle diameters (D50) are preferably at least 0.05 μm, more preferably at least 0.1 μm, and most preferably at least 0.2 μm. Herein, the "average particle diameter" in the present description refers to an average diameter on a volume basis measured using a laser diffraction/scattering particle size distribution measuring device.

(Mixing Step)

A mixing step is a step for mixing powder of materials constituting the solid electrolyte layer, the positive electrode layer, and the negative electrode layer with respect to each layer. For mixing, a ball mill, a hybrid mixer, a beads mill, and others are usable. In the case of slurry formation, mixing with a solvent, a dispersant, a binder, and others is possible.

(Forming Step)

When powder is compressed in a mold as a method for forming a precursor layer, for example, powder is filled in a body formed of stainless steel and then compressed from above. The compression pressure is preferably 5 MPa to 200 MPa.

As the method for forming a precursor layer, powder is formed into slurry and then a doctor blade method, a silk screen method, or the like is usable as a method for forming a film.

It is possible that film formation is carried out on a film coated with a releasing agent or a film is formed directly on the other layer to be laminated.

The thicknesses of the precursors of the solid electrolyte layer, the positive electrode layer, and the negative electrode layer formed in this forming step are determined according to a targeted thickness after sintering. Since the precursor is contracted through compression and sintering, the thickness of the precursor is set to be in the range of 300% to 120% of the targeted thickness after sintering.

(Sintering Step)

A sintering step is a step for densifying powder constituting a precursor of each layer by heating to connect each interlayer together. As a sintering method, a method for sintering a laminated cell by being nipped with a ceramic setter in a heating furnace, a method for hot-pressing a laminated cell, or the like is usable. In the sintering step, it is preferable that a laminated cell is heated and compressed at the same time in order to further promote densification of the laminated cell and reduce the internal resistance of a battery.

In the sintering step, the highest temperature upon heating is preferably set in a range where a solid electrolyte, an electrode active material, and others constituting each corresponding layer are not melted or phase-changed. The upper limit of this highest temperature is preferably 1100° C., more preferably 1050° C., and most preferably 1000° C. On the other hand, when this highest temperature is low, sintering does not progress, resulting in no densification and therefore, the lower limit of this highest temperature is preferably 400° C., more preferably 700° C., and most preferably 800° C.

In the case of carrying out compression in the sintering step, the lower limit of pressure is preferably 100 kPa, more preferably 1 MPa, and most preferably 10 MPa. Further, from the viewpoint of reducing breakage of a mold and a compressed raw material composition, this pressure upper limit is preferably 800 MPa, more preferably 400 MPa, and most preferably 200 MPa.

It is possible to perform the sintering step in the atmosphere. Further, it is possible to carry out sintering in an ambience containing at least one type of gas selected from $N_2$, $H_2$, He, Ar, $CO_2$, CO, and $CH_4$. This makes it possible to reduce alteration and destruction by fire of a raw material composition and a heat treatment apparatus.

(Formation of Current Collector)

It is possible that the method for producing the all-solid lithium ion secondary battery of the present invention includes a step of forming a current collector on a positive electrode layer and/or a negative electrode layer. This makes it possible that electricity is more easily picked up through the current collector and therefore, charging to an all-solid second battery and discharging from an all-solid lithium ion secondary battery are able to be easily carried out. As a specific embodiment where a current collector is laminated, it is possible that a thin film-like metal layer is laminated on or bonded to a positive electrode layer and/or a negative electrode layer formed, or a metal layer or a precursor of an electric conductor is laminated on a raw material composition, followed by sintering. Herein, if the electron conductivity of the electrode layer itself is high, the current collector does not need to be formed.

EXAMPLES

The present invention will now be described with reference to specific examples.

(Production of Solid Electrolyte Crystal)

As a solid electrolyte crystal containing polyphosphoric acid, materials of the compositions listed in Table 1 to Table 4 were produced. As raw materials, $LiPO_3$ or $Li_2CO_3$, $TiO_2$, $ZrO_2$, MgO, $Al_2O_3$ or $AlPO_4$, $Y_2O_3$, $SiO_2$, and $H_3PO_4$ were selected depending on constituent elements and then these raw materials were mixed at a stoichiometric ratio. Of the raw materials after mixing, one where $ZrO_2$ was used as the raw material was sintered at 1350° C. for 1 hour on a platinum plate and one where $TiO_2$ was used as the raw material was sintered at 1200° C. for 1 hour on the same. After sintering, an obtained sample was milled to a size of at most 100 μm using a stamp mill and further milled using a planetary ball mill by adding YTZ balls of ϕ2 mm and ethanol. The thus-obtained powder was dried and then powder of a solid electrolyte crystal having an average particle diameter of 1.0 μm (D50) was obtained.

The solid electrolyte crystal described in Table 1 has a NASICON-type crystal structure in which a material where constituent elements were Li, Zr, Si, P, and O was used as a base and Al was added.

The solid electrolyte crystal described in Table 2 has a NASICON-type crystal structure in which a material where Li, Zr, Si, P, and O were constituent elements was used as a base and Mg was added.

The solid electrolyte crystal described in Table 3 has a NASICON-type crystal structure in which a material where Li, Ti, Si, P, and O were constituent elements was used as a base and Al was added.

The solid electrolyte crystal described in Table 4 has a NASICON-type crystal structure in which a material where Li, Zr, Si, P, and O were constituent elements was used as a base, Al was added and Li was excessively used.

Herein, the "$Li_2O$ concentration (mol %)" in the tables each represents the content of a $Li_2O$ component in terms of mol % on an oxide basis.

For a relative comparison of the lithium ion conductivity of the produced powder of the solid electrolyte crystal, this powder was placed on a mold having an inner diameter of ϕ11 and pressed at a pressure of 200 MPa using a uniaxial press machine, followed by sintering at 1100° C. to produce a circular pellet having a thickness of 0.5 mm and a diameter of 20 mm, and then gold was vapor-deposited on the pellet, and the lithium ion conductivity of which was measured at 25° C. using an impedance analyzer (model 1260, produced by Solartron Co.). The measured lithium ion conductivities are listed in Table 1 to Table 4.

TABLE 1

| Sample No. | Crystal Composition | Li$_2$O Concentration (mol %) | Lithium Ion Conductivity (×10$^{-6}$ S/cm) |
|---|---|---|---|
| LZP (Al) -0 | Li$_{1.1}$Zr$_2$Si$_{0.1}$P$_{2.9}$O$_{12}$ | 13.1 | 3.7 |
| LZP (Al) -1 | Li$_{1.2}$Al$_{0.1}$Zr$_{1.9}$Si$_{0.1}$P$_{2.9}$O$_{12}$ | 14.6 | 4.2 |
| LZP (Al) -2 | Li$_{1.3}$Al$_{0.2}$Zr$_{1.8}$Si$_{0.1}$P$_{2.9}$O$_{12}$ | 15.9 | 4.1 |
| LZP (Al) -3 | Li$_{1.4}$Al$_{0.3}$Zr$_{1.7}$Si$_{0.1}$P$_{2.9}$O$_{12}$ | 17.1 | 4.2 |
| LZP (Al) -4 | Li$_{1.5}$Al$_{0.4}$Zr$_{1.6}$Si$_{0.1}$P$_{2.9}$O$_{12}$ | 18.3 | 4.2 |
| LZP (Al) -5 | Li$_{1.6}$Al$_{0.5}$Zr$_{1.5}$Si$_{0.1}$P$_{2.9}$O$_{12}$ | 19.5 | 4 |
| LZP (Al) -6 | Li$_{1.7}$Al$_{0.6}$Zr$_{1.4}$Si$_{0.1}$P$_{2.9}$O$_{12}$ | 20.7 | 3.8 |
| LZP (Al) -7 | Li$_{1.8}$Al$_{0.7}$Zr$_{1.3}$Si$_{0.1}$P$_{2.9}$O$_{12}$ | 22.0 | 3.5 |
| LZP (Al) -8 | Li$_{1.9}$Al$_{0.8}$Zr$_{1.2}$Si$_{0.1}$P$_{2.9}$O$_{12}$ | 23.2 | 3.2 |
| LZP (Al) -9 | Li$_{2.0}$Al$_{0.9}$Zr$_{1.1}$Si$_{0.1}$P$_{2.9}$O$_{12}$ | 24.4 | 2.5 |
| LZP (Al) -10 | Li$_{2.1}$Al$_{1.0}$Zr$_{1.0}$Si$_{0.1}$P$_{2.9}$O$_{12}$ | 25.6 | 1 |

TABLE 2

| Sample No. | Crystal Composition | Li$_2$O Concentration (mol %) | Lithium Ion Conductivity (×10$^{-6}$ S/cm) |
|---|---|---|---|
| LZP (Mg) -0 | Li$_{1.1}$Zr$_2$Si$_{0.1}$P$_{2.9}$O$_{12}$ | 13.1 | 3.7 |
| LZP (Mg) -1 | Li$_{1.2}$Mg$_{0.05}$Zr$_{1.95}$Si$_{0.1}$P$_{2.9}$O$_{12}$ | 14.6 | 3.4 |
| LZP (Mg) -2 | Li$_{1.3}$Mg$_{0.1}$Zr$_{1.9}$Si$_{0.1}$P$_{2.9}$O$_{12}$ | 15.9 | 3.2 |
| LZP (Mg) -3 | Li$_{1.4}$Mg$_{0.15}$Zr$_{1.85}$Si$_{0.1}$P$_{2.9}$O$_{12}$ | 17.1 | 3.3 |
| LZP (Mg) -4 | Li$_{1.5}$Mg$_{0.20}$Zr$_{1.9}$Si$_{0.1}$P$_{2.9}$O$_{12}$ | 18.3 | 3.4 |
| LZP (Mg) -5 | Li$_{1.6}$Mg$_{0.25}$Zr$_{1.9}$Si$_{0.1}$P$_{2.9}$O$_{12}$ | 19.5 | 3.5 |
| LZP (Mg) -6 | Li$_{1.7}$Mg$_{0.3}$Zr$_{1.9}$Si$_{0.1}$P$_{2.9}$O$_{12}$ | 20.7 | 3.5 |
| LZP (Mg) -7 | Li$_{1.8}$Mg$_{0.35}$Zr$_{1.9}$Si$_{0.1}$P$_{2.9}$O$_{12}$ | 22.0 | 3.4 |
| LZP (Mg) -8 | Li$_{1.9}$Mg$_{0.40}$Zr$_{1.9}$Si$_{0.1}$P$_{2.9}$O$_{12}$ | 23.2 | 3.3 |
| LZP (Mg) -9 | Li$_{2.0}$Mg$_{0.45}$Zr$_{1.9}$Si$_{0.1}$P$_{2.9}$O$_{12}$ | 24.4 | 3.2 |
| LZP (Mg) -10 | Li$_{2.1}$Mg$_{0.5}$Zr$_{1.9}$Si$_{0.1}$P$_{2.9}$O$_{12}$ | 25.6 | 3.2 |

TABLE 3

| Sample No. | Crystal Composition | Li$_2$O Concentration (mol %) | Lithium Ion Conductivity (×10$^{-6}$ S/cm) |
|---|---|---|---|
| LATP-0 | Li$_{1.1}$Ti$_2$Si$_{0.1}$P$_{2.9}$O$_{12}$ | 13.1 | 62 |
| LATP-1 | Li$_{1.2}$Al$_{0.1}$Ti$_{1.9}$Si$_{0.1}$P$_{2.9}$O$_{12}$ | 14.6 | 68 |
| LATP-2 | Li$_{1.3}$Al$_{0.2}$Ti$_{1.9}$Si$_{0.1}$P$_{2.9}$O$_{12}$ | 15.9 | 65 |
| LATP-3 | Li$_{1.4}$Al$_{0.3}$Ti$_{1.9}$Si$_{0.1}$P$_{2.9}$O$_{12}$ | 17.1 | 64 |
| LATP-4 | Li$_{1.5}$Al$_{0.4}$Ti$_{1.9}$Si$_{0.1}$P$_{2.9}$O$_{12}$ | 18.3 | 65 |
| LATP-5 | Li$_{1.6}$Al$_{0.5}$Ti$_{1.9}$Si$_{0.1}$P$_{2.9}$O$_{12}$ | 19.5 | 60 |
| LATP-6 | Li$_{1.7}$Al$_{0.6}$Ti$_{1.9}$Si$_{0.1}$P$_{2.9}$O$_{12}$ | 20.7 | 58 |
| LATP-7 | Li$_{1.8}$Al$_{0.7}$Ti$_{1.9}$Si$_{0.1}$P$_{2.9}$O$_{12}$ | 22.0 | 53 |
| LATP-8 | Li$_{1.9}$Al$_{0.8}$Ti$_{1.9}$Si$_{0.1}$P$_{2.9}$O$_{12}$ | 23.2 | 42 |
| LATP-9 | Li$_{2.0}$Al$_{0.9}$Ti$_{1.9}$Si$_{0.1}$P$_{2.9}$O$_{12}$ | 24.4 | 31 |
| LATP-10 | Li$_{2.1}$Al$_{1.0}$Ti$_{1.9}$Si$_{0.1}$P$_{2.9}$O$_{12}$ | 25.6 | 12 |

TABLE 4

| Sample No. | Crystal Composition | Li$_2$O Concentration (mol %) | Lithium Ion Conductivity (×10$^{-6}$ S/cm) |
|---|---|---|---|
| LZP (Al) -11 | Li$_{1.1}$Al$_{0.2}$Zr$_{1.8}$Si$_{0.1}$P$_{2.9}$O$_{12}$ | 13.8 | 5.2 |
| LZP (Al) -12 | Li$_{1.2}$Al$_{0.2}$Zr$_{1.8}$Si$_{0.1}$P$_{2.9}$O$_x$ | 14.8 | 5.1 |
| LZP (Al) -13 | Li$_{1.3}$Al$_{0.2}$Zr$_{1.8}$Si$_{0.1}$P$_{2.9}$O$_{12}$ | 15.9 | 4.8 |
| LZP (Al) -14 | Li$_{1.4}$Al$_{0.2}$Zr$_{1.8}$Si$_{0.1}$P$_{2.9}$O$_x$ | 16.9 | 4.7 |
| LZP (Al) -15 | Li$_{1.5}$Al$_{0.2}$Zr$_{1.8}$Si$_{0.1}$P$_{2.9}$O$_x$ | 17.9 | 4.6 |
| LZP (Al) -16 | Li$_{1.6}$Al$_{0.2}$Zr$_{1.8}$Si$_{0.1}$P$_{2.9}$O$_x$ | 18.8 | 4 |
| LZP (Al) -17 | Li$_{1.7}$Al$_{0.2}$Zr$_{1.8}$Si$_{0.1}$P$_{2.9}$O$_x$ | 19.8 | 3.2 |
| LZP (Al) -18 | Li$_{1.8}$Al$_{0.2}$Zr$_{1.8}$Si$_{0.1}$P$_{2.9}$O$_x$ | 20.7 | 2.2 |
| LZP (Al) -19 | Li$_{1.9}$Al$_{0.2}$Zr$_{1.8}$Si$_{0.1}$P$_{2.9}$O$_x$ | 21.6 | 1.2 |

TABLE 4-continued

| Sample No. | Crystal Composition | Li$_2$O Concentration (mol %) | Lithium Ion Conductivity (×10$^{-6}$ S/cm) |
|---|---|---|---|
| LZP (Al) -20 | Li$_{2.0}$Al$_{0.2}$Zr$_{1.8}$Si$_{0.1}$P$_{2.9}$O$_x$ | 22.5 | 0.6 |
| LZP (Al) -21 | Li$_{2.1}$Al$_{0.2}$Zr$_{1.8}$Si$_{0.1}$P$_{2.9}$O$_x$ | 23.3 | 0.1 |

(Production of Lithium Ion Conductive Glass)

As a lithium ion conductive glass, Li$_2$O—Al$_2$O$_3$—P$_2$O$_5$ type glass was produced. Raw materials were weighed so that Li$_2$O, Al$_2$O$_3$, and P$_2$O$_5$ were included at 50 mol %, 6 mol %, and 44 mol %, respectively, based on an oxide-basis composition, and uniformly mixed, followed by being molten at 1250° C. The molten glass was cast on an iron plate to produce a lithium ion conductive glass. The lithium ion conductivity of this glass at 25° C. was determined to be 1×10$^{-7}$ S/cm. This lithium ion conductive glass was milled to an average particle diameter of 2 μm (D50) using a stamp mill and a planetary ball mill to obtain powder of the lithium ion conductive glass.

(Half Battery Configuration Evaluation)

To evaluate the degree of reaction at the interface between a solid electrolyte crystal and a positive electrode active material depending on the difference in the content of Li$_2$O in the solid electrolyte crystal, a half battery was produced and then a charge-discharge test was conducted.

As the solid electrolyte crystal, powder of the solid electrolyte crystals described in Table 1 to Table 4 was used. As the positive electrode active material, LiFePO$_4$ was used. LiFePO$_4$ is a type of phosphate having an olivine structure.

Five percent by weight of powder of the above-produced lithium ion conductive glass was added to powder of each solid electrolyte crystal, followed by mixing to obtain powder for a solid electrolyte layer.

Further, 70% by weight of powder of each solid electrolyte crystal, 15% by weight of LiFePO$_4$ as the electrode active material, 10% by weight of acetylene black, and 5% by weight of powder of the lithium ion conductive glass were mixed to obtain powder for a positive electrode layer. A mold having an inner diameter of φ11 was charged with 0.1 g of powder for the positive electrode layer and the surface was adjusted by pressing using a pressing mold having an outer diameter of about φ11 mm, followed by further addition of 0.03 g of powder of the solid electrolyte layer and adjustment of the surface in the same manner, and then sintering by hot press was carried out at 600° C. and 2000 kg/cm$^2$ to produce 43 types of circular sintered bodies having an outer diameter of φ11 mm and a thickness of 0.12 mm. (Since LZP(Al)—O and LZP(Mg)—O are the same,) the solid electrolyte crystals in the powder for the solid electrolyte layer and the powder for the positive electrode layer are the same.

The thickness of the solid electrolyte layer after sintering was 100 μm. The thickness of the positive electrode layer was 20 μm.

A polymer electrolyte including LiTFSI and a copolymer of ethylene oxide, polypropylene oxide, and allyl glycidyl ether (ZEOSPAN 8100, produced by Zeon Corp.) was bonded to the solid electrolyte layer side of the sintered body, followed by further bonding of Li metal, and a current collector formed of aluminum foil was bonded to the positive electrode layer side of the sintered body, followed by packaging using aluminum laminate for outside air blocking to produce a half battery.

The produced half battery was charged at 1/100 C by constant current and the charge was stopped when 4.5 V was reached, followed by discharge at 1/100 C by constant current, and the discharge capacity until reaching 2.5 V was measured to calculate the discharge capacity per weight of the positive electrode active material. The obtained results are described in Table 5 to Table 8 and FIG. 1.

TABLE 5

| Sample No. | Crystal Composition | Li$_2$O Concentration (mol %) | Discharge Capacity (mAh/g) |
|---|---|---|---|
| LZP (Al) -0 | Li$_{1.1}$Zr$_2$Si$_{0.1}$P$_{2.9}$O$_{12}$ | 13.1 | 53 |
| LZP (Al) -1 | Li$_{1.2}$Al$_{0.1}$Zr$_{1.9}$Si$_{0.1}$P$_{2.9}$O$_{12}$ | 14.6 | 54 |
| LZP (Al) -2 | Li$_{1.3}$Al$_{0.2}$Zr$_{1.8}$Si$_{0.1}$P$_{2.9}$O$_{12}$ | 15.9 | 52 |
| LZP (Al) -3 | Li$_{1.4}$Al$_{0.3}$Zr$_{1.7}$Si$_{0.1}$P$_{2.9}$O$_{12}$ | 17.1 | 69 |
| LZP (Al) -4 | Li$_{1.5}$Al$_{0.4}$Zr$_{1.6}$Si$_{0.1}$P$_{2.9}$O$_{12}$ | 18.3 | 90 |
| LZP (Al) -5 | Li$_{1.6}$Al$_{0.5}$Zr$_{1.5}$Si$_{0.1}$P$_{2.9}$O$_{12}$ | 19.5 | 110 |
| LZP (Al) -6 | Li$_{1.7}$Al$_{0.6}$Zr$_{1.4}$Si$_{0.1}$P$_{2.9}$O$_{12}$ | 20.7 | 130 |
| LZP (Al) -7 | Li$_{1.8}$Al$_{0.7}$Zr$_{1.3}$Si$_{0.1}$P$_{2.9}$O$_{12}$ | 22.0 | 140 |
| LZP (Al) -8 | Li$_{1.9}$Al$_{0.8}$Zr$_{1.2}$Si$_{0.1}$P$_{2.9}$O$_{12}$ | 23.2 | 145 |
| LZP (Al) -9 | Li$_{2.0}$Al$_{0.9}$Zr$_{1.1}$Si$_{0.1}$P$_{2.9}$O$_{12}$ | 24.4 | 140 |
| LZP (Al) -10 | Li$_{2.1}$Al$_{1.0}$Zr$_{1.0}$Si$_{0.1}$P$_{2.9}$O$_{12}$ | 25.6 | 130 |

TABLE 6

| Sample No. | Crystal Composition | Li$_2$O Concentration (mol %) | Discharge Capacity (mAh/g) |
|---|---|---|---|
| LZP (Mg) -0 | Li$_{1.1}$Zr$_2$Si$_{0.1}$P$_{2.9}$O$_{12}$ | 13.1 | 53 |
| LZP (Mg) -1 | Li$_{1.2}$Mg$_{0.05}$Zr$_{1.95}$Si$_{0.1}$P$_{2.9}$O$_{12}$ | 14.6 | 54 |
| LZP (Mg) -2 | Li$_{1.3}$Mg$_{0.1}$Zr$_{1.9}$Si$_{0.1}$P$_{2.9}$O$_{12}$ | 15.9 | 58 |
| LZP (Mg) -3 | Li$_{1.4}$Mg$_{0.15}$Zr$_{1.85}$Si$_{0.1}$P$_{2.9}$O$_{12}$ | 17.1 | 85 |
| LZP (Mg) -4 | Li$_{1.5}$Mg$_{0.20}$Zr$_{1.9}$Si$_{0.1}$P$_{2.9}$O$_{12}$ | 18.3 | 113 |
| LZP (Mg) -5 | Li$_{1.6}$Mg$_{0.25}$Zr$_{1.9}$Si$_{0.1}$P$_{2.9}$O$_{12}$ | 19.5 | 142 |
| LZP (Mg) -6 | Li$_{1.7}$Mg$_{0.3}$Zr$_{1.9}$Si$_{0.1}$P$_{2.9}$O$_{12}$ | 20.7 | 158 |
| LZP (Mg) -7 | Li$_{1.8}$Mg$_{0.35}$Zr$_{1.9}$Si$_{0.1}$P$_{2.9}$O$_{12}$ | 22.0 | 161 |
| LZP (Mg) -8 | Li$_{1.9}$Mg$_{0.40}$Zr$_{1.9}$Si$_{0.1}$P$_{2.9}$O$_{12}$ | 23.2 | 162 |
| LZP (Mg) -9 | Li$_{2.0}$Mg$_{0.45}$Zr$_{1.9}$Si$_{0.1}$P$_{2.9}$O$_{12}$ | 24.4 | 160 |
| LZP (Mg) -10 | Li$_{2.1}$Mg$_{0.5}$Zr$_{1.9}$Si$_{0.1}$P$_{2.9}$O$_{12}$ | 25.6 | 161 |

TABLE 7

| Sample No. | Crystal Composition | Li$_2$O Concentration (mol %) | Discharge Capacity (mAh/g) |
|---|---|---|---|
| LATP-0 | Li$_{1.1}$Ti$_2$Si$_{0.1}$P$_{2.9}$O$_{12}$ | 13.1 | 13 |
| LATP-1 | Li$_{1.2}$Al$_{0.1}$Ti$_{1.9}$Si$_{0.1}$P$_{2.9}$O$_{12}$ | 14.6 | 14 |
| LATP-2 | Li$_{1.3}$Al$_{0.2}$Ti$_{1.9}$Si$_{0.1}$P$_{2.9}$O$_{12}$ | 15.9 | 12 |
| LATP-3 | Li$_{1.4}$Al$_{0.3}$Ti$_{1.9}$Si$_{0.1}$P$_{2.9}$O$_{12}$ | 17.1 | 22 |
| LATP-4 | Li$_{1.5}$Al$_{0.4}$Ti$_{1.9}$Si$_{0.1}$P$_{2.9}$O$_{12}$ | 18.3 | 38 |
| LATP-5 | Li$_{1.6}$Al$_{0.5}$Ti$_{1.9}$Si$_{0.1}$P$_{2.9}$O$_{12}$ | 19.5 | 54 |
| LATP-6 | Li$_{1.7}$Al$_{0.6}$Ti$_{1.9}$Si$_{0.1}$P$_{2.9}$O$_{12}$ | 20.7 | 72 |
| LATP-7 | Li$_{1.8}$Al$_{0.7}$Ti$_{1.9}$Si$_{0.1}$P$_{2.9}$O$_{12}$ | 22.0 | 95 |
| LATP-8 | Li$_{1.9}$Al$_{0.8}$Ti$_{1.9}$Si$_{0.1}$P$_{2.9}$O$_{12}$ | 23.2 | 121 |
| LATP-9 | Li$_{2.0}$Al$_{0.9}$Ti$_{1.9}$Si$_{0.1}$P$_{2.9}$O$_{12}$ | 24.4 | 120 |
| LATP-10 | Li$_{2.1}$Al$_{1.0}$Ti$_{1.9}$Si$_{0.1}$P$_{2.9}$O$_{12}$ | 25.6 | 100 |

TABLE 8

| Sample No. | Crystal Composition | Li$_2$O Concentration (mol %) | Discharge Capacity (mAh/g) |
|---|---|---|---|
| LZP (Al) -11 | Li$_{1.1}$Al$_{0.2}$Zr$_{1.8}$Si$_{0.1}$P$_{2.9}$O$_x$ | 13.8 | 53 |
| LZP (Al) -12 | Li$_{1.2}$Al$_{0.2}$Zr$_{1.8}$Si$_{0.1}$P$_{2.9}$O$_x$ | 14.8 | 54 |
| LZP (Al) -13 | Li$_{1.3}$Al$_{0.2}$Zr$_{1.8}$Si$_{0.1}$P$_{2.9}$O$_{12}$ | 15.9 | 52 |
| LZP (Al) -14 | Li$_{1.4}$Al$_{0.2}$Zr$_{1.8}$Si$_{0.1}$P$_{2.9}$O$_x$ | 16.9 | 62 |
| LZP (Al) -15 | Li$_{1.5}$Al$_{0.2}$Zr$_{1.8}$Si$_{0.1}$P$_{2.9}$O$_x$ | 17.9 | 74 |
| LZP (Al) -16 | Li$_{1.6}$Al$_{0.2}$Zr$_{1.8}$Si$_{0.1}$P$_{2.9}$O$_x$ | 18.8 | 86 |
| LZP (Al) -17 | Li$_{1.7}$Al$_{0.2}$Zr$_{1.8}$Si$_{0.1}$P$_{2.9}$O$_x$ | 19.8 | 98 |
| LZP (Al) -18 | Li$_{1.8}$Al$_{0.2}$Zr$_{1.8}$Si$_{0.1}$P$_{2.9}$O$_x$ | 20.7 | 104 |
| LZP (Al) -19 | Li$_{1.9}$Al$_{0.2}$Zr$_{1.8}$Si$_{0.1}$P$_{2.9}$O$_x$ | 21.6 | 102 |
| LZP (Al) -20 | Li$_{2.0}$Al$_{0.2}$Zr$_{1.8}$Si$_{0.1}$P$_{2.9}$O$_x$ | 22.5 | 96 |
| LZP (Al) -21 | Li$_{2.1}$Al$_{0.2}$Zr$_{1.8}$Si$_{0.1}$P$_{2.9}$O$_x$ | 23.3 | 83 |

The discharge capacity of any one of the solid electrolyte crystals was found not to largely change in the range of a Li$_2$O content of 13 mol % to 16 mol %, but the discharge capacity rapidly increases when 16 mol % was exceeded. The reason is inferred as follows: at the interface between the solid electrolyte crystal and the positive electrode active material, generation of an inactive material was inhibited. On the other hand, in half batteries using the solid electrolyte crystals described in Table 1, Table 3, and Table 4, when the Li$_2$O content of the solid electrolyte crystal increased to at least a certain value, the discharge capacity decreased. The reason is thought as follows: since Li$_2$O was added at a high Li$_2$O content, the crystal structure of the electrolyte changed. In a half battery using the solid electrolyte crystal described in Table 2, 160 mAh/g close to a theoretical capacity was maintained even at a high Li$_2$O content.

(All-Solid Battery Evaluation)

An all-solid lithium ion secondary battery was produced by co-sintering a negative electrode layer, a solid electrolyte layer, and a positive electrode layer and then evaluated.

As a negative electrode active material and a positive electrode active material, Li$_4$Ti$_5$O$_{12}$ (produced by Titan Kogyo, Ltd.) and LiFePO$_4$ were used, respectively. As a solid electrolyte crystal, the one described in Table 9 was used. LiFePO$_4$ is a type of phosphate having an olivine structure.

Fifteen percent by weight of powder (average particle diameter: 0.5 μm (D50)) of Li$_4$Ti$_5$O$_{12}$, 70% by weight of powder (average particle diameter: 1 μm (D50)) of the solid electrolyte crystal, 10% by weight of acetylene black powder (average particle diameter: 0.05 μm (D50)), and 5% by weight of powder (average particle diameter: 2 μm (D50)) of the above-produced lithium ion conductive glass were mixed to produce powder for a negative electrode layer.

Five percent by weight of powder (average particle diameter: 2 μm (D50)) of the lithium ion conductive glass was added to powder (average particle diameter: 1 μm (D50)) of the solid electrolyte crystal, followed by mixing to produce powder for a solid electrolyte layer.

Fifteen percent by weight of powder (average particle diameter: 0.5 μm (D50)) of LiFePO$_4$, 70% by weight of powder (average particle diameter: 1 μm (D50)) of the solid electrolyte crystal, 10% by weight of acetylene black powder (average particle diameter: 0.035 μm (D50)), and 5% by weight of powder (average particle diameter: 2 μm (D50)) of the above-produced lithium ion conductive glass were mixed to produce powder for a positive electrode layer.

A mold of ϕ11 mm was charged with 0.03 g of powder for the negative electrode layer and the surface was adjusted using a pressing mold having an outer diameter of about ϕ11 mm, followed by further addition of 0.1 g of powder for the solid electrolyte layer and adjustment of the surface in the same manner, and 0.03 g of powder for the positive electrode layer was added, followed by adjustment of the surface in the same manner, and sintering by hot press was carried out at 600° C. and 2000 kg/cm$^2$ to obtain 8 types of all-solid lithium ion secondary batteries.

The thicknesses of the solid electrolyte layers were 50 μm to 100 μm, the thicknesses of the positive electrode layers were 10 μm to 30 μm, and the thicknesses of the negative electrode layers were 10 μm to 30 μm.

Herein, the same solid electrolyte crystal was used for the solid electrolyte layer, the positive electrode layer, and the negative electrode layer.

A current collector of aluminum foil and a current collector of copper foil were disposed on the positive electrode side and the negative electrode side, respectively, and thereby the current collector and the electrodes were brought into contact by vacuum packing using an aluminum laminate pack.

With respect to the produced all-solid lithium ion secondary batteries, charge-discharge measurement was carried out at room temperature. A charge-discharge rate was set at 1/100 C, and then constant current charge at a 3.3 V cut-off voltage and constant current discharge at a 0 V cut-off voltage were carried out.

The charge capacity and the discharge capacity per unit weight of the positive electrode active material of each battery are listed in Table 9. In the batteries of the examples where the $Li_2O$ content of the solid electrolyte crystal fell within the range of the present invention, generation of an inactive material at the interface between the solid electrolyte crystal and the electrode active material was inhibited and therefore the discharge capacity was remarkably enhanced.

Further, charge-discharge curves of the batteries of Comparative Example 3 and Example 3 are shown in FIG. 2. The battery of Example 3 having a relatively large $Li_2O$ content was higher in charge-discharge capacity than the battery of Comparative Example 3.

(Evaluation of All-Solid Batteries Using Different Positive Electrodes)

In the same manner as in Examples 1 to 4, all-solid lithium ion secondary batteries were produced and then evaluated. All the batteries were produced in the same conditions as for Examples 1 to 4 except that the compositions of the solid electrolyte crystal and the positive electrode active material were changed.

In Comparative Example 5 and Example 5 each, as the solid electrolyte crystal, the one described in Table 10 was used, and as the positive electrode active material, $LiFe_{0.1}Mn_{0.9}PO_4$ was used.

In Comparative Example 6 and Example 6 each, as the solid electrolyte crystal, the one described in Table 10 was used, and as the positive electrode active material, $LiFe_{0.1}CO_{0.8}Ni_{0.1}PO_4$ was used.

With respect to the produced all-solid lithium ion secondary batteries, charge-discharge measurement was carried out at room temperature. A charge-discharge rate was set at 1/100 C, and in the batteries of Comparative Example 5 and Example 5, constant current charge at a 4.0 V cut-off voltage and constant current discharge at a 0 V cut-off voltage were carried out and in the batteries of Comparative Example 6 and Example 6, constant current charge at a 4.9 V cut-off voltage and constant current discharge at a 0 V cut-off voltage were carried out. The test results are listed in Table 10.

Although the discharge capacities were lower than in those using $LiFePO_4$ and less than a theoretical capacity, in any conditions, with respect to the batteries using a solid electrolyte crystal having a $Li_2O$ content falling within the range of the present invention, a several times large discharge capacity as compared to those using a solid electrolyte crystal having a smaller $Li_2O$ content was realized. Also in a positive electrode active material having an olivine structure of a high potential type, controlling the $Li_2O$ content was confirmed to be effective.

TABLE 9

|  | Solid Electrolyte Crystal Composition | $Li_2O$ Concentration (mol %) | Charge Capacity (mAh/g) | Discharge Capacity (mAh/g) |
| --- | --- | --- | --- | --- |
| Comparative Example 1 | $Li_{1.2}Al_{0.1}Ti_{1.9}Si_{0.1}P_{2.9}O_{12}$ | 14.6 | 12 | 11 |
| Comparative Example 2 | $Li_{1.2}Al_{0.1}Zr_{1.9}Si_{0.1}P_{2.9}O_{12}$ | 14.6 | 55 | 52 |
| Comparative Example 3 | $Li_{1.2}Mg_{0.05}Zr_{1.95}Si_{0.1}P_{2.9}O_{12}$ | 14.6 | 57 | 54 |
| Comparative Example 4 | $Li_{1.2}Al_{0.2}Zr_{1.8}Si_{0.1}P_{2.9}O_x$ | 14.8 | 54 | 52 |
| Example 1 | $Li_{1.9}A_{0.8}Ti_{1.9}Si_{0.1}P_{2.9}O_{12}$ | 23.2 | 117 | 112 |
| Example 2 | $Li_{1.9}Al_{1.8}Zr_{1.2}Si_{0.1}P_{2.9}O_{12}$ | 23.2 | 142 | 135 |
| Example 3 | $Li_{1.9}Mg_{0.40}Zr_{1.9}Si_{0.1}P_{2.9}O_{12}$ | 23.2 | 161 | 153 |
| Example 4 | $Li_{2.1}Al_{0.2}Zr_{1.8}Si_{0.1}P_{2.9}O_x$ | 23.3 | 80 | 76 |

TABLE 10

|  | Solid Electrolyte Crystal Composition | Li$_2$O Concentration (mol %) | Charge Capacity mAh/g | Discharge Capacity mAh/g |
|---|---|---|---|---|
| Comparative Example 5 | Li$_{1.2}$Mg$_{0.05}$Zr$_{1.95}$Si$_{0.1}$P$_{2.9}$O$_{12}$ | 14.6 | 35 | 32 |
| Example 5 | Li$_{1.9}$Mg$_{0.40}$Zr$_{1.9}$Si$_{0.1}$P$_{2.9}$O$_{12}$ | 23.2 | 112 | 102 |
| Comparative Example 6 | Li$_{1.2}$Mg$_{0.05}$Zr$_{1.95}$Si$_{0.1}$P$_{2.9}$O$_{12}$ | 14.6 | 17 | 14 |
| Example 6 | Li$_{1.9}$Mg$_{0.40}$Zr$_{1.9}$Si$_{0.1}$P$_{2.9}$O$_{12}$ | 23.2 | 93 | 85 |

What is claimed is:

1. An all-solid lithium ion secondary battery comprising a positive electrode layer, a negative electrode layer, and a solid electrolyte layer disposed between the positive electrode layer and the negative electrode layer, wherein
an electrode active material included in the positive electrode layer is a phosphate having an olivine structure;
a solid electrolyte crystal included in the solid electrolyte layer is polyphosphate-containing NASICON-type Li$_{1+x}$M$_y$Zr$_{2-y}$Si$_z$P$_{3-z}$O$_{12+a}$, and a content of Li$_2$O is 16 mol % to 25 mol % in terms of mol % on an oxide basis, where M is at least one selected from Al, La, Sr, Mg, Y, Ba, Zn, Sc, and Ca, x is 0.1 to 1.2, y is 0.1 to 1.1, z is 0.1 to 1.0, and a is −1.0 to 1.0.

2. The all-solid lithium ion secondary battery according to claim 1, wherein a solid electrolyte crystal included in the solid electrolyte layer is NASICON-type Li$_{1+x}$M$_y$Zr$_{2-y}$Si$_z$P$_{3-z}$O$_{12+a}$,
where M is at least one selected from Mg, Ca, and Sr, x is 0.1 to 1.2, y is 0.1 to 0.55, z is 0.1 to 1.0, and a is −1.0 to 1.0.

3. The all-solid lithium ion secondary battery according to claim 1, wherein an electrode active material included in the positive electrode layer, an electrode active material included in the negative electrode layer, and a solid electrolyte crystal included in the solid electrolyte layer have crystal structures differing from each other.

4. The all-solid lithium ion secondary battery according to claim 1, wherein an electrode active material included in the positive electrode layer is Li$_n$M'PO$_4$,
where M' is at least one selected from Fe, Co, Mn, Ni, Al, Mg, Ca, Ti, and Zr and n is 0.7 to 1.5.

5. The all-solid lithium ion secondary battery according to claim 1, wherein an electrode active material included in the negative electrode layer is Li$_4$Ti$_5$O$_{12}$, anatase-type TiO$_2$, or NASICON-type Li$_{1+x}$Ti$_{2-x}$(PO$_4$)$_3$.

6. The all-solid lithium ion secondary battery according to claim 1, wherein at least one of the positive electrode layer, the negative electrode layer, and the solid electrolyte layer includes 2 to 15% by weight of a lithium ion conductive glass.

7. The all solid lithium ion secondary battery according to claim 1, wherein
at least one of the positive electrode layer, the negative electrode layer and the solid electrolyte layer contains 2 to 15% by weight of glass comprising Li$_2$O, Al$_2$O$_3$ and P$_2$O$_5$.

8. The all-solid lithium ion secondary battery according to claim 7, wherein an electrode active material included in the positive electrode layer, an electrode active material included in the negative electrode layer, and a solid electrolyte crystal included in the solid electrolyte layer have crystal structures differing from each other.

9. The all-solid lithium ion secondary battery according to claim 7, wherein an electrode active material included in the positive electrode layer is Li$_n$M'PO$_4$, where M' is at least one selected from Fe, Co, Mn, Ni, Al, Mg, Ca, Ti, and Zr and n is 0.7 to 1.5.

10. The all-solid lithium ion secondary battery according to claim 7, wherein an electrode active material included in the negative electrode layer is Li$_4$Ti$_5$O$_{12}$, anatase-type TiO$_2$, or NASICON-type Li$_{1+x}$Ti$_{2-x}$(PO$_4$)$_3$.

11. The all-solid lithium ion secondary battery according to claim 7, wherein at least one of the positive electrode layer and the negative electrode layer includes acetylene black.

12. The all-solid lithium ion secondary battery according to claim 1, wherein at least one of the positive electrode layer and the negative electrode layer includes acetylene black.

13. An all-solid lithium ion secondary battery comprising a positive electrode layer, a negative electrode layer, and a solid electrolyte layer disposed between the positive electrode layer and the negative electrode layer, wherein
an electrode active material included in the positive electrode layer is a phosphate having an olivine structure;
a solid electrolyte crystal included in the solid electrolyte layer is polyphosphate-containing NASICON-type Li$_{1+x}$M$_y$Zr$_{2-y}$Si$_z$P$_{3-z}$O$_{12+a}$, and a content of Li$_2$O is 16 mol % to 25 mol % in terms of mol % on an oxide basis, where M is at least one selected from Mg, Ca, and Sr, R is at least one selected from Ge, Ti, and Zr, x is 0.1 to 1.2, y is 0.1 to 0.55, z is 0.1 to 1.0, and a is −1.0 to 1.0.

14. The all-solid lithium ion secondary battery according to claim 13, wherein an electrode active material included in the positive electrode layer, an electrode active material included in the negative electrode layer, and a solid electrolyte crystal included in the solid electrolyte layer have crystal structures differing from each other.

15. The all-solid lithium ion secondary battery according to claim 13, wherein an electrode active material included in the positive electrode layer is Li$_n$M'PO$_4$,
where M' is at least one selected from Fe, Co, Mn, Ni, Al, Mg, Ca, Ti, and Zr and n is 0.7 to 1.5.

16. The all-solid lithium ion secondary battery according to claim 13, wherein an electrode active material included in the negative electrode layer is Li$_4$Ti$_5$O$_{12}$, anatase-type TiO$_2$, or NASICON-type Li$_{1+x}$Ti$_{2-x}$(PO$_4$)$_3$.

17. The all-solid lithium ion secondary battery according to claim 13, wherein at least one of the positive electrode layer, the negative electrode layer, and the solid electrolyte layer includes 2 to 15% by weight of a lithium ion conductive glass.

18. The all-solid lithium ion secondary battery according to claim 13, wherein at least one of the positive electrode layer and the negative electrode layer includes acetylene black.

19. The all-solid lithium ion secondary battery according to claim 13, wherein at least one of the positive electrode layer, the negative electrode layer and the solid electrolyte layer contains 2 to 15% by weight of glass comprising Li$_2$O, Al$_2$O$_3$ and P$_2$O$_5$.

20. The all-solid lithium ion secondary battery according to claim 19, wherein an electrode active material included in the positive electrode layer, an electrode active material included in the negative electrode layer, and a solid electrolyte crystal included in the solid electrolyte layer have crystal structures differing from each other.

21. The all-solid lithium ion secondary battery according to claim 19, wherein an electrode active material included in the positive electrode layer is $Li_nM'PO_4$, where M' is at least one selected from Fe, Co, Mn, Ni, Al, Mg, Ca, Ti, and Zr and n is 0.7 to 1.5.

22. The all-solid lithium ion secondary battery according to claim 19, wherein an electrode active material included in the negative electrode layer is $Li_4Ti_5O_{12}$, anatase-type $TiO_2$, or NASICON-type $Li_{1+x}Ti_{2-x}(PO_4)_3$.

23. The all-solid lithium ion secondary battery according to claim 19, wherein at least one of the positive electrode layer and the negative electrode layer includes acetylene black.

\* \* \* \* \*